US007752323B2

(12) United States Patent
Linares et al.

(10) Patent No.: US 7,752,323 B2
(45) Date of Patent: Jul. 6, 2010

(54) REPACKING PROCEDURE FOR STREAMING PACKET SWITCHED SERVICES

(75) Inventors: Héctor Montes Linares, Granada (ES); Daniel Fernández Maestra, Málaga (ES)

(73) Assignee: Nokia Corporation, Espoo (FI)

( * ) Notice: Subject to any disclaimer, the term of this patent is extended or adjusted under 35 U.S.C. 154(b) by 1288 days.

(21) Appl. No.: 10/514,550

(22) PCT Filed: May 21, 2002

(86) PCT No.: PCT/IB02/02586

§ 371 (c)(1),
(2), (4) Date: Jan. 19, 2005

(87) PCT Pub. No.: WO03/098948

PCT Pub. Date: Nov. 27, 2003

(65) Prior Publication Data

US 2005/0226026 A1    Oct. 13, 2005

(51) Int. Cl.
*G06F 15/173* (2006.01)
*G06F 15/16* (2006.01)
*H04W 72/00* (2009.01)
*H04L 12/66* (2006.01)

(52) U.S. Cl. .................... 709/230; 709/227; 455/452.1; 455/452.2; 370/352

(58) Field of Classification Search .............. 709/236, 709/227–235, 226; 340/825.01–825.98; 370/470–476, 352–356, 331–332, 400–412; 455/452.1–452.2, 445, 450
See application file for complete search history.

(56) References Cited

U.S. PATENT DOCUMENTS

| 4,256,925 | A | * | 3/1981 | Goode ........................ 370/322 |
| 5,327,428 | A | * | 7/1994 | Van As et al. .............. 370/353 |
| 5,729,534 | A | * | 3/1998 | Jokinen et al. ............. 370/280 |
| 6,374,112 | B1 | * | 4/2002 | Widegren et al. ......... 455/452.2 |
| 6,487,595 | B1 | * | 11/2002 | Turunen et al. ............. 709/226 |
| 6,788,664 | B1 | * | 9/2004 | Thomas et al. ............. 370/336 |

(Continued)

FOREIGN PATENT DOCUMENTS

WO    WO 99/16266    4/1999

(Continued)

OTHER PUBLICATIONS

"Packet Data Service Over Networks with Dynamic Stealing of Voice Channels", Giuseppe Bianchi et al., Global Telecommunications Conference, 1995. GLOBECOM '95., IEEE, vol. 2, p. 1152-1156.*

(Continued)

*Primary Examiner*—Saleh Najjar
*Assistant Examiner*—Edward J Kim
(74) *Attorney, Agent, or Firm*—Alston & Bird LLP

(57) ABSTRACT

A method and apparatus of arbitrating network resource allocation request to reallocate Packet-Switched (PC) dedicated territory as circuit-switched (CS) territory usable for CS connections within a telecommunications network. The extent of any guaranteed bit-rate (GBR) connections within the requested reallocation region of the packet-switched (PS) dedicated territory is determined. Where possible, GBR connections are reallocated within the PS dedicated territory to outside the requested reallocation region. In the event some or all of the requested reallocation region adjacent CS territory is free, it is reallocated as CS territory.

26 Claims, 2 Drawing Sheets

U.S. PATENT DOCUMENTS

| | | | | |
|---|---|---|---|---|
| 7,274,691 | B2* | 9/2007 | Rogers | 370/389 |
| 2002/0051462 | A1* | 5/2002 | Ertel et al. | 370/442 |
| 2002/0061012 | A1* | 5/2002 | Thi et al. | 370/352 |
| 2002/0137532 | A1* | 9/2002 | Landais et al. | 455/466 |
| 2004/0252697 | A1* | 12/2004 | Wille et al. | 370/395.21 |

FOREIGN PATENT DOCUMENTS

| | | |
|---|---|---|
| WO | WO 00/01186 | 1/2000 |
| WO | WO 02/13471 | 2/2002 |

OTHER PUBLICATIONS

"Streaming technology in 3G mobile communication systems", Computer, Sep. 2001, vol. 34 Issue 9, p. 46-52.*

"Real-time voice over Packet Switched Networks", Kostas et al., IEEE Network, Jan./Feb. 1998.*

"EDGE: Enhanced Data Rates for GSM and TDMA/136 Evolution", Furuskar et al., IEEE Personal Communications, Jun. 1999.*

"TSG-SA Working Group 1 (services) meeting #4", Quebec City, Canada, Jul. 5-9, 1999, TSGS1#4(99)529, Agenda Item 6.3.1.*

Eriksson et al., "The challenges of voice over IP over wireless", Ericsson Review No. 01, 2000, Issue Jan. 2000.*

Wieselthier et al, "Performance analysis of fixed- and movable-boundary channel-access schemes for integrated voice/data wireless networks", Networking: Foundation for the Future, Proceedings of the Annual Joint Conference of the Computer and Communications Societies INFOCOM), vol. 2, Conf. 12, Mar. 28, 1993, pp. 1204-1213, XP010032362.

Tanimoto et al, "Circuit and Packet Integrated Switching Architecture for an Opticalloop Network", IEICE Transactions on Communications, Institute of Electronics Information and Comm. Eng. Tokyo, Japan, vol. E80-B, No. 2, Feb. 1, 1997, pp. 332-338, XP000721915.

* cited by examiner

REPACKING PROCEDURE FOR STREAMING PACKET SWITCHED SERVICES

FIELD OF INVENTION

The present invention relates to a method for repacking of channels for guaranteed bit-rate services.

The present invention has been developed to allow better allocation of channels in a General Packet Radio Service (GPRS) network where there is a potential conflict between circuit-switched and packet-switched, and will be described hereinafter with reference to this application. However, it will be appreciated that the invention has application under other existing or future standards.

BACKGROUND TO INVENTION

In relation to the evolving GPRS proposals and standards, it is proposed to provide a first pool of channels called packet-switched (PS) territory used for PS traffic and a second pool of channels called circuit-switched (CS) territory used for CS traffic. To maximize the performance of a network using this arrangement, it is desirable to allow intelligent interaction between these two territories.

One way of achieving this has been to divide the PS territory into dedicated PS capacity (only for PS connections) and PS default capacity (for either PS or CS connections, but for PS as a default). One difficulty with this arrangement has been that CS traffic is given higher priority than PS traffic in the PS default capacity. This meant that a request for downgrading of the PS territory would result in disconnection of PS connections where necessary to satisfy the request. Whilst this was previously considered acceptable in many situations, the rise of streaming PS services requiring a guaranteed throughput has generated a need to allow similar priorities for PS and CS connections.

A further improvement of this arrangement has been to further divide the PS default capacity into a temporary dedicated territory (TDT) and default PS territory. TDT is used for PS and CS connections. The default PS territory is used for PS connections as a default, but can also be used for CS connections. Moreover, CS connections are given higher priority than PS connections within default PS territory, meaning that a PS territory downgrade request is always accepted even though the resources were in use by PS connections allocated in the default PS territory.

When a two-pool model for radio resource allocation is used, and streaming-PS connections have the same allocation/retention priority as CS connections, channels allocated to streaming PS within the TDT cannot be used for CS connections. This means that when a PS territory downgrade is requested and there is at least one streaming-PS connection allocated in the channels susceptible to be downgraded, the request will be rejected. The requested channels do not therefore become CS territory, but are maintained as PS channels. This situation will involve CS blocking, as PS territory downgrades are performed when CS Radio Resource Manager (RRM) needs more channels for new incoming connections.

It is an object of the present invention to provide a method of improving usage of network resources shared by PS and CS connections.

SUMMARY OF INVENTION

According to the invention, there is provided a method of arbitrating a network resource allocation request to reallocate PS dedicated territory as CS territory usable for CS connections within a telecommunications network, the method including the steps of:

(a) determining the extent of any guaranteed bit-rate (GBR) connections within the requested reallocation region of the PS dedicated territory, the requested reallocation region being adjacent the CS territory; and (b) in the event one or more GBR connections exist within the requested extension region:

(i) ascertaining whether one or more of the GBR connections can be reallocated within the PS dedicated territory outside the requested reallocation region, and reallocating any such GBR connections accordingly; and (ii) in the event some or all of the requested reallocation region adjacent the CS territory is then free, reallocating it as CS territory.

Preferably, one or more CS connections are established in the reallocated CS territory.

In a preferred form, the invention further includes the step, after step (a), of dealing with any non-GBR connections within the requested reallocation region in accordance with a predetermined network policy. Preferably, the policy includes attempting to reallocate at least some or the non-GBR connections into a region of the PS territory not forming part of the requested reallocation region.

Preferably, the method includes the step of disconnecting any non-GBR connections that cannot be reallocated into the region of the PS territory not forming part of the requested reallocation region.

In a preferred form, the PS dedicated territory is temporary dedicated territory, and preferably, the request is a PS downgrade request. Alternatively, the request can be a PS channel request.

The regions and territories can comprise timeslots.

In a particular embodiment, one or more of the connections is multiplexed over two or more timeslots, and step (b)(i) includes ascertaining whether all of the timeslots of the one or more multiplexed connections can be reallocated within the PS dedicated territory outside the requested reallocation region. Any such GBR connections are reallocated accordingly.

In another aspect, the invention provides telecommunications network apparatus for arbitrating a network resource allocation request to reallocate Packet-Switched (PS) dedicated territory as Circuit-Switched (CS) territory usable for CS connections within the telecommunications network, the network being configured to:

(a) determine the extent of any guaranteed bit-rate (GBR) connections within the requested reallocation region of the Packet-switched (PS) dedicated territory, the requested reallocation region being adjacent the CS territory; and (b) in the event one or more GBR connections exist within the requested extension region:

(i) ascertain whether one or more of the GBR connections can be reallocated within the PS dedicated territory outside the requested reallocation region, and to reallocate any such GBR connections accordingly; and (ii) in the event some or all of the requested reallocation region adjacent the CS territory is then free, reallocate it as CS territory.

Preferably, the telecommunications network apparatus includes a Packet Control Unit (PCU) within a Base Station Controller (BSC) in the telecommunications network, the PCU being configured to perform the reallocation steps.

BRIEF DESCRIPTION OF DRAWINGS

Preferred embodiments of the invention will now be described, by way of example only, with reference to the accompanying drawings, in which.

DETAILED DESCRIPTION OF PREFERRED EMBODIMENT

Figure 1:
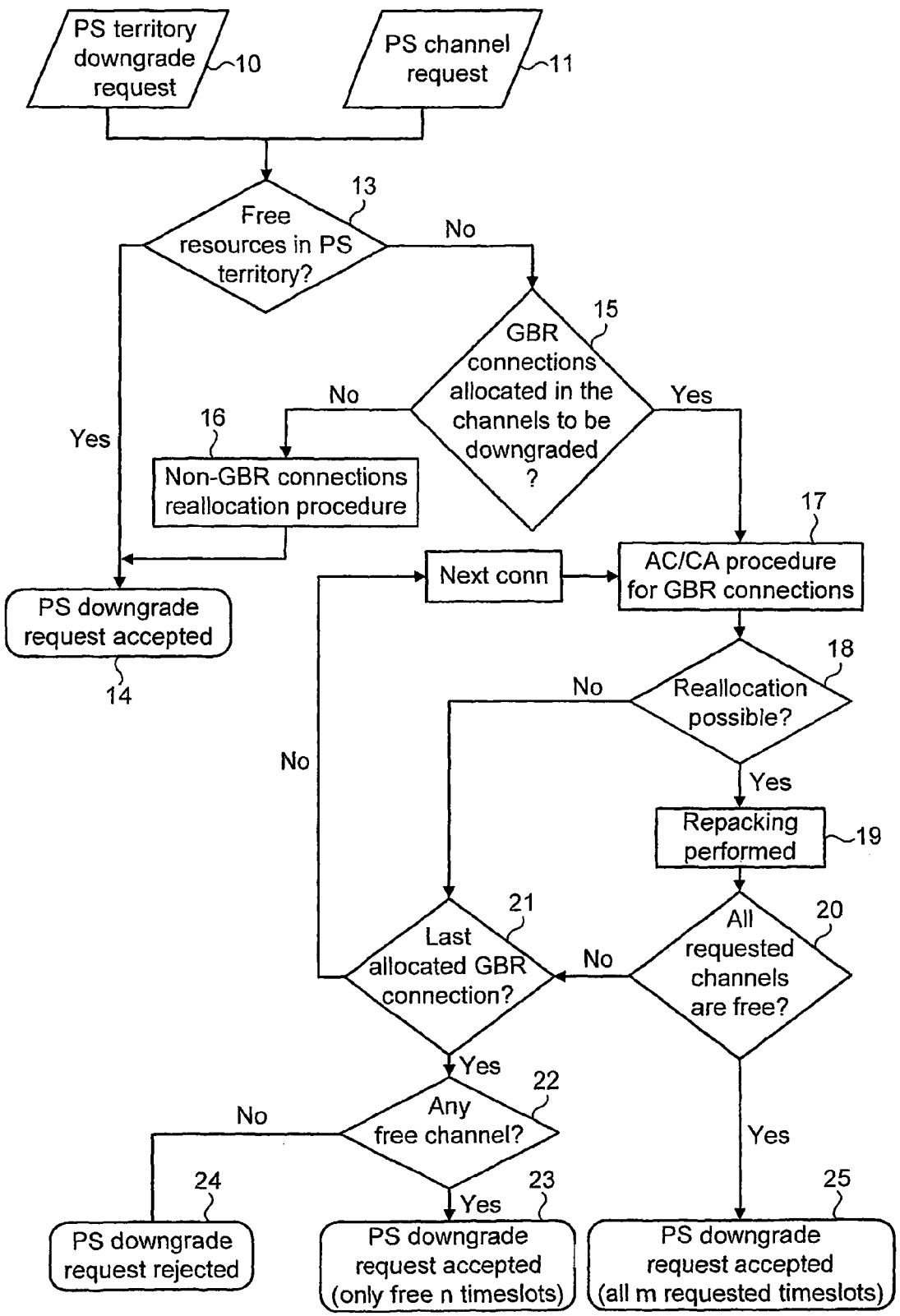
FIG. 1 is a flowchart illustrating steps in a method of arbitrating a network resource allocation request to reallocate PS dedicated territory as CS territory usable for CS connections, in accordance with the invention.
Figure 2:
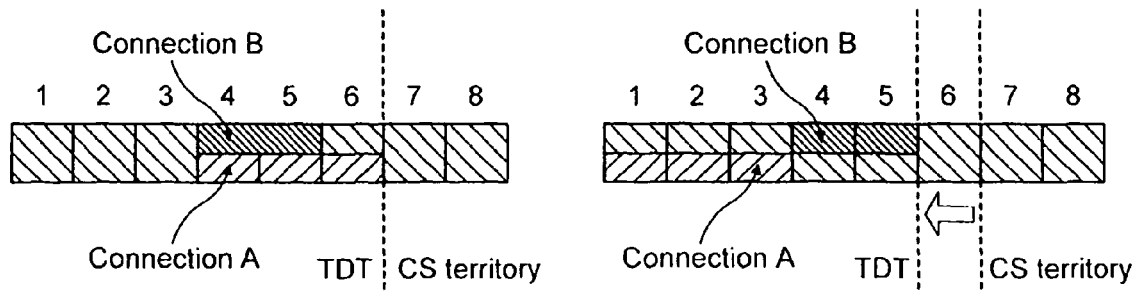
FIG. 2 shows the handling of a network resource request in accordance with the method shown in Figure, in a first scenario.
Figure 3:
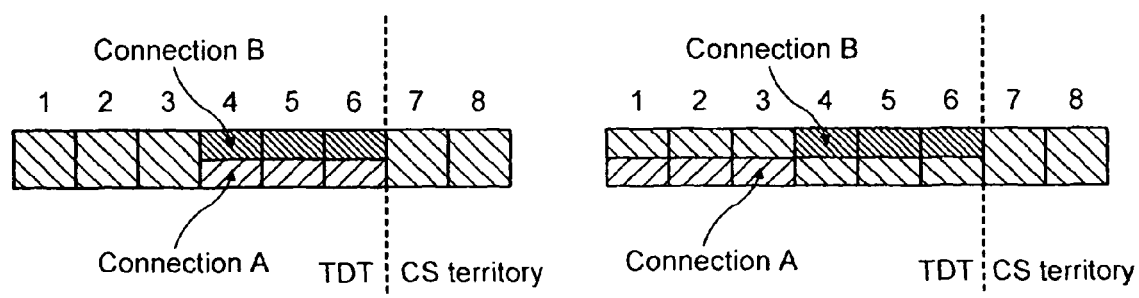
FIG. 3 shows the handling of a network resource request in accordance with the method shown in Figure, in a second scenario.
Figure 4:
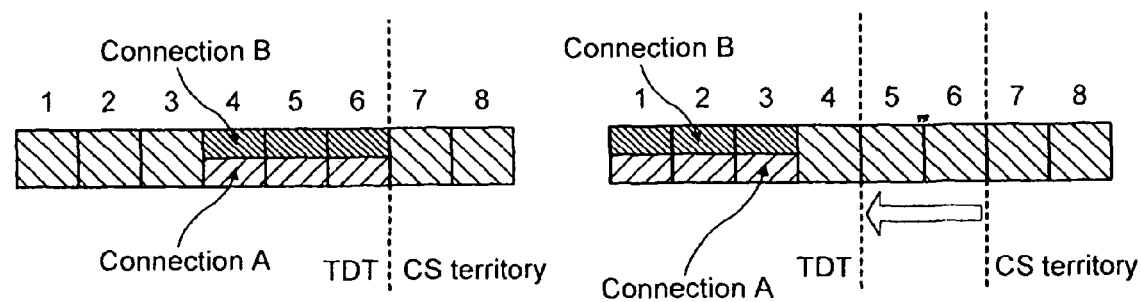
FIG. 4 shows the handling of a network resource request in accordance with the method shown in Figure, in a third scenario.

Referring to the drawings, and FIG. 1, there is shown a method of arbitrating a network resource allocation request to reallocate PS dedicated territory as CS territory usable for CS connections. The request can take the form of, for example, a packet switched (PS) downgrade request 10 or a PS channel request 11. Whilst there are technical differences between such requests, the behavior of the packet control unit (PCU) is the same in both cases. For the purposes of this description, the downgrade request will be considered, but it will be appreciated that the invention has application in other cases where there is a need or desire to reallocate dedicated PS territory for use by CS connections.

The PCU determines (step 13) whether there are sufficient free resources in the channel region adjacent the CS territory to allow the CS territory to be expanded and the request fulfilled. It does this by comparing the number of channels sent as a parameter of the request with information about the Temporary Block Flows (TBF) presently allocated in the PS territory.

In the event there are sufficient resources, the PS downgrade request can be satisfied directly (step 14). However, if the resources are not initially available, it is necessary to ascertain (step 15) whether any of the existing connections in the requested region are of a streaming-PS type. This is because streaming-PS connections have associated with them a guaranteed bit-rate (GBR) that must be satisfied. If GBR connections do not exist, then any connections in the requested region can be reallocated (step 16) on the basis of network rules. Typically, this will involve attempting to reallocate the channels associated with any such connection to a region of the PS territory that is not associated with the downgrade request. If there is no such sufficient capacity, then the non-GBR connection will, not likely, be dropped. However, the precise behavior of the network on this point is not critical.

If there are GBR connections in the channels to be downgraded, then the PCU initiates an Admission Control (AC) procedure (step 17) for attempting to reallocate the GBR connections. This involves ascertaining (step 18) for each connection whether there are sufficient free resources outside the resource region associated with the downgrade request to support that connection with suitable QoS. If reallocation is possible, then the connection is repacked (step 19) into the new resource region. If all the requested channels are free at this stage (step 20), then the PS downgraded request is accepted (step 25) and the TDT in the relevant region is freed up for the use of CS connections.

If the required channels are not all free, but there are other connections to consider (step 21), then the procedure returns to step 17. If there are no connections left to consider, then it is determined (step 22) whether there are any channels that have been freed in the resource region immediately adjacent the CS useable region. If there are, then the PS downgrade request is partially granted (step 23) to the extent possible. If no channels are free, the PS downgrade request is rejected (step 24).

In order to better illustrate the behavior of the invention in different situations, several some specific examples are described below. In all the following use cases it is assumed that the number of channels requested in each PS territory downgrade is m=2. Another assumption is that TDT-CS territory border is between timeslot (TSL) TSL 6 and TSL 7 (see FIGS. 2 to 5).

CASE 1 (FIG. 2)
Preconditions:
There are two streaming-PS connections allocated in the TDT
Connection A is using TSLs 4, 5 & 6
Connection B is using TSLs 4 & 5
TSLs 1, 2 & 3 are loaded such that only one of the connections (either A or B) is capable of being allocated within them.
Actions:
1. Connections allocated in TSL 6 are firstly checked. In this case, only connection A exists in that TSL.
2. In this case, repacking of Connection A is possible, and it is reallocated to TSLs 1, 2 & 3.
3. Connections allocated in TSL 5 are then checked. In this case, only connection B exists in that TSL (connection A having already been moved from that TSL).
4. In this case, repacking of Connection B is not possible.
5. As there is no more streaming-PS connections allocated in TSLs 5 & 6 (the channels susceptible to being downgraded), it is checked whether some of those TSLs are free.
6. As TSL 6 has no streaming-PS connections allocated in it, PS territory downgrade request is accepted, but only one channel can be downgraded (n=1)
Postconditions
Repacking procedure is successful
PS territory is downgraded with n=1
CS traffic is not blocked
CASE 2 (FIG. 3)
Preconditions:
There are two streaming-PS connections allocated in the TDT
Connection A is using TSLs 4, 5 & 6
Connection B is using TSLs 4, 5 & 6
TSLs 1, 2 & 3 are loaded such that only one of the connections (either A or B) is capable of being allocated within them.
Actions:
1. Connections allocated in TSL 6 are firstly checked. In this case, both connections A & B exist in that TSL.
2. In this case, repacking of Connection A is possible, and it is reallocated to TSLs 1, 2 & 3.
3. In this case, repacking of Connection B is not possible.
4. As there is no more streaming-PS connections allocated in TSLs 5 & 6 (the channels susceptible to being downgraded), it is checked whether some of those TSLs are free.
5. As Connection B is not re-allocated, it is still using TSL 5 & 6. Hence, the PS territory downgrade request is rejected.

Postconditions;
Repacking procedure is not successful (since connection B is not re-allocated)
PS territory is not downgraded (n=0)
CS traffic is blocked
CASE 3 (FIG. 4)
Preconditions:
There are two streaming-PS connections allocated in the TDT
Connection A is using TSLs 4, 5 & 6
Connection B is using TSLs 4, 5 & 6
TSLs 1, 2 & 3 are loaded such that both connections A and B are capable of being allocated within them.
Actions:
1. Connections allocated in TSL 6 are firstly checked. In this case, both connections A & B exist in that TSL.
2. In this case, repacking of Connection A is possible, and it is reallocated to TSLs 1, 2 & 3.
3. In this case, repacking of Connection B is possible, and it is reallocated to TSLs 1, 2 & 3.
4. As there are no more streaming-PS connections allocated in TSLs 5 & 6 (the channels susceptible to be downgraded), it is checked whether some of those TSLs are free.
5. As both connections A & B are re-allocated, the PS territory downgrade request is accepted for the requested number of channels (n=m=2)
Postconditions:
Repacking procedure is successful
PS territory is downgraded (n=m=2)
CS traffic is not blocked In general terms, another issue to be taken into the account is the statistical multiplexing of streaming services over the same timeslots. Repacking of such a connection requires reallocation of all resources (eg, channels) associated with that connection. Accordingly, in that case partial granting of the downgrade request will not be possible.

It will also be appreciated that the resources referred to can be spectral, time or channel based. For example, the resources can be timeslots, frequency bands, or a combination of the two.

Although the invention has been described with reference to a number of specific embodiments, it will be appreciated by those skilled in the art that the invention can be embodied in many other forms.

The invention claimed is:
1. A method, comprising:
    determining a presence of any guaranteed bit-rate connections within a requested reallocation region of a packet-switched territory, the requested reallocation region being adjacent to a circuit-switched territory;
    in the event one or more guaranteed bit-rate connections exist within a requested reallocation region, ascertaining whether one or more of the guaranteed bit-rate connections can be reallocated within the packet-switched territory outside the requested reallocation region, and directing relocation of any such guaranteed bit-rate connections accordingly, and
    in the event some or all of the requested reallocation region adjacent the circuit-switched territory is then free, directing relocation of some or all of the free requested reallocation region as the circuit-switched territory; and
    directing enforcement of a predetermined network policy on any non-guaranteed bit-rate connections within the requested reallocation region.
2. The method according to claim 1, further comprising:
    directing establishment of one or more circuit-switched connections in the reallocated circuit-switched territory.
3. The method according to claim 1, wherein the directing enforcement includes directing reallocation of at least some of the non-guaranteed bit-rate connections into a region of the packet-switched territory not forming part of the requested reallocation region.
4. The method according to claim 1, further comprising:
    directing disconnection of any non-guaranteed bit-rate connections that cannot be reallocated into the region of the packet-switched territory not forming part of the requested reallocation region.
5. The method according to claim 1, wherein the packet-switched territory is temporary dedicated territory.
6. The method according to claim 1, further comprising:
    configuring a network resource allocation request to reallocate packet-switched territory as circuit-switched territory usable for circuit-switched connections within a telecommunications network to comprise a packet-switched downgrade request.
7. The method according to claim 1, further comprising:
    configuring a network resource allocation request to reallocate packet-switched territory as circuit-switched territory usable for circuit-switched connections within a telecommunications network to comprise a packet-switched channel request.
8. The method according to claim 1, wherein the regions comprise timeslots.
9. The method according to claim 8, wherein one or more of the connections is multiplexed over two or more timeslots, and wherein the ascertaining includes ascertaining whether all of the timeslots of the one or more multiplexed connections can be reallocated within the packet-switched territory outside the requested reallocation region, and directing relocation of any such guaranteed bit-rate connections accordingly.
10. The method according to claim 1, wherein a telecommunications network of the method is an enhanced general packet radio service network.
11. The method according to claim 10, wherein the telecommunications network of the method is a general packet radio service support nodes network.
12. The method according to claim 1, wherein at least one of the determining, the ascertaining, the directing reallocation of the guaranteed bit-rate connections, and the directing reallocation of some or all of the free requested reallocation region are implemented in a packet controller within a base station controller in a telecommunications network.
13. The method according to claim 1, wherein a telecommunications network of the method is a third generation network.
14. A method, comprising:
    determining a presence of any guaranteed bit-rate connections within a requested reallocation region of a packet-switched territory, the requested reallocation region being adjacent to a circuit-switched territory;
    ascertaining whether one or more of the guaranteed bit-rate connections within a requested reallocation region of a packet-switched territory can be reallocated within the packet-switched territory outside the requested reallocation region, the requested reallocation region being adjacent to a circuit-switched territory;
    directing reallocation of any such guaranteed bit-rate connections accordingly;
    directing reallocation of some or all of the requested reallocation region as circuit-switched territory in the event that said some or all of the requested reallocation region is then free; and directing enforcement of a predetermined network policy on any non-guaranteed bit-rate connections within the requested reallocation region.

15. The method according to claim 14, further comprising:
directing performance of the reallocation of the guaranteed bit-rate connections and the reallocation of some or all of the requested reallocation region by a packet controller within a base station controller in a telecommunications network.

16. The method according to claim 14, further comprising:
directing establishment of one or more circuit-switched connections in the reallocated circuit-switched territory.

17. The method according to claim 14, wherein the packet-switched territory is temporary dedicated territory.

18. The method according to claim 14, further comprising:
configuring a network resource allocation request to reallocate packet-switched territory as circuit-switched territory usable for circuit-switched connections within a telecommunications network to comprise a packet-switched downgrade request.

19. The method according to claim 14, further comprising:
configuring a network resource allocation request to reallocate packet-switched territory as circuit-switched territory usable for circuit-switched connections within a telecommunications network to comprise a packet-switched channel request.

20. The method according to claim 14, wherein one or more of the connections is multiplexed over two or more timeslots, and wherein the ascertaining includes ascertaining whether all of the timeslots of the one or more multiplexed connections can be reallocated within the packet-switched territory outside the requested reallocation region, and directing reallocation of any such guaranteed bit-rate connections accordingly.

21. The method according to claim 14, wherein at least one of the ascertaining, the directing reallocation of the guaranteed bit-rate connections, and the directing reallocation of some or all of the requested reallocation region are implemented in a packet controller within a base station controller in a telecommunications network.

22. An apparatus comprising at least one processor and at least one memory including computer program code, the at least one memory and the computer program code configured to, with the at least one processor, cause the apparatus at least to:
determine a presence of any guaranteed bit-rate connections within a requested reallocation region of a packet-switched territory, the requested reallocation region being adjacent to a circuit-switched territory;
ascertain whether one or more of the guaranteed bit-rate connections within a requested reallocation region of a packet-switched territory can be reallocated within the packet-switched territory outside the requested reallocation region, the requested reallocation region being adjacent to a circuit-switched territory;
direct reallocation of any such guaranteed bit-rate connections accordingly;
direct reallocation of some or all of the requested reallocation region as circuit-switched territory in the event some or all of the requested reallocation region is then free; and direct enforcement of a predetermined network policy on any non-guaranteed bit-rate connections within the requested reallocation region.

23. The apparatus according to claim 22, wherein the processor configured to cause the apparatus to direct reallocation of any such guaranteed bit-rate connections and direct reallocation of some or all of the requested reallocation region is included within a packet controller within a base station controller in a telecommunications network.

24. An apparatus, comprising:
means for determining a presence of any guaranteed bit-rate connections within a requested reallocation region of a packet-switched territory, the requested reallocation region being adjacent to a circuit-switched territory;
ascertaining means for ascertaining whether one or more of the guaranteed bit-rate connections within a requested reallocation region of a packet-switched territory can be reallocated within the packet-switched territory outside the requested reallocation region, the requested reallocation region being adjacent to a circuit-switched territory;
connection reallocating means for directing reallocation of any such guaranteed bit-rate connections accordingly;
territory reallocating means for directing reallocation of some or all of the requested reallocation region as circuit-switched territory in the event some or all of the requested reallocation region is then free; and
means for directing enforcement of a predetermined network policy on any non-guaranteed bit-rate connections within the requested reallocation region.

25. The apparatus according to claim 24, further comprising:
packet controlling means within a base station controlling means in a telecommunications network, the packet controlling means comprising the connection reallocating means and the territory reallocating means.

26. A computer program product embodied on memory, the computer program product comprising program code configured to control a computer to perform a method, the method comprising:
determining a presence of any guaranteed bit-rate connections within a requested reallocation region of a packet-switched territory, the requested reallocation region being adjacent to a circuit-switched territory,
ascertaining whether one or more of the guaranteed bit-rate connections within a requested reallocation region of a packet-switched territory can be reallocated within the packet-switched territory outside the requested reallocation region, the requested reallocation region being adjacent to a circuit-switched territory;
directing reallocation of any such guaranteed bit-rate connections accordingly; and
directing reallocation of some or all of the requested reallocation region as circuit-switched territory in the event that said some or all of the requested reallocation region is then free; and
directing enforcement of a predetermined network policy on any non-guaranteed bit-rate connections within the requested reallocation region.

* * * * *